United States Patent
Xu et al.

(10) Patent No.: US 12,147,373 B2
(45) Date of Patent: *Nov. 19, 2024

(54) PERIPHERAL COMPONENT INTERCONNECT (PCI) HOSTING DEVICE

(71) Applicant: Zenlayer Innovation LLC, Wilmington, DE (US)

(72) Inventors: Jun Xu, Cupertino, CA (US); Seagle Yang, Rosemead, CA (US)

(73) Assignee: Zenlayer Innovation LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,293

(22) Filed: Jun. 12, 2023

(65) Prior Publication Data

US 2023/0409507 A1    Dec. 21, 2023

Related U.S. Application Data

(63) Continuation of application No. 17/316,710, filed on May 10, 2021, now Pat. No. 11,714,775.

(51) Int. Cl.
*G06F 13/42* (2006.01)
*G06F 9/4401* (2018.01)
*H04L 9/40* (2022.01)

(52) U.S. Cl.
CPC ........ *G06F 13/4221* (2013.01); *G06F 9/4411* (2013.01); *H04L 63/0442* (2013.01);
(Continued)

(58) Field of Classification Search
CPC .............. G06F 13/4221; G06F 9/4411; G06F 2213/0024; G06F 2213/0026; H04L 63/0442; H04L 2212/00
(Continued)

(56) References Cited

U.S. PATENT DOCUMENTS 7,480,303 B1    1/2009  Ngai
7,502,884 B1    3/2009  Shah et al.
(Continued)

FOREIGN PATENT DOCUMENTS

CN    211062041 U    7/2020

OTHER PUBLICATIONS

Intel, "Intel(registered) Ethernet Network Adapter E810-XXVDA2", Technical Specifications, Available Online at <https://www.intel.com/content/www/us/en/products/network-io/ethernet/ethernet-adapters/ethernet-800-series-network-adapters/e810-xxvda2.html>, Retrieved on Feb. 1, 2021, 6 pages.
(Continued)

*Primary Examiner* — Idriss N Alrobaye
*Assistant Examiner* — Henry W Yu
(74) *Attorney, Agent, or Firm* — Nicholson De Vos Webster & Elliott LLP

(57) ABSTRACT

Methods and systems are disclosed to aggregate traffic from multiple server devices through a peripheral component interconnect (PCI) hosting device. In one embodiment, the PCI hosting device comprises a network interface to couple the PCI hosting device to a network, a plurality of PCI interfaces, a processing circuit to forward packets, and a power supply to supply power to the PCI interfaces independently from the plurality of server devices. Each of the PCI interfaces is designed to be coupled to one server device to the PCI hosting device, which is registered as a first PCI board of a first server device through a first PCI interface and as a second PCI board of a second server device through a second PCI interface, and the PCI hosting device is designed to forward packets between the network interface and the first server device, and the network interface and the second server device.

20 Claims, 6 Drawing Sheets

(52) U.S. Cl.
CPC ............... *G06F 2213/0024* (2013.01); *G06F 2213/0026* (2013.01); *H04L 2212/00* (2013.01)

(58) Field of Classification Search
USPC .... 710/2, 12, 33, 51, 62, 64, 105, 300, 301, 710/316
See application file for complete search history.

(56) References Cited

U.S. PATENT DOCUMENTS

| | | |
|---|---|---|
| 10,055,379 B2 | 8/2018 | Shin |
| 10,095,645 B2 | 10/2018 | Davis et al. |
| 10,467,165 B2 | 11/2019 | Watkins et al. |
| 10,810,151 B2 | 10/2020 | Fang |
| 2004/0260842 A1 | 12/2004 | Pettey et al. |
| 2007/0047536 A1 | 3/2007 | Scherer et al. |
| 2012/0005392 A1 | 1/2012 | Yagi |
| 2013/0111082 A1 | 5/2013 | Baba et al. |
| 2014/0016648 A1 | 1/2014 | Hidaka |
| 2014/0317220 A1 | 10/2014 | Karlsson et al. |
| 2015/0169487 A1 | 6/2015 | Subramaniyan et al. |
| 2016/0266925 A1 | 9/2016 | Wei |
| 2017/0011002 A1 | 1/2017 | Shin |
| 2017/0262396 A1 | 9/2017 | Mundt et al. |
| 2017/0286353 A1 | 10/2017 | Tamarkin et al. |
| 2017/0344294 A1 | 11/2017 | Mishra et al. |
| 2018/0101494 A1 | 4/2018 | Davis et al. |
| 2019/0042292 A1 | 2/2019 | Palermo et al. |
| 2019/0068509 A1 | 2/2019 | Hyatt et al. |

OTHER PUBLICATIONS

SoonTech, "SoonTech 8 GPU Miner Mining Motherboard for Building a Mining Rig, Mining ETH Ethereum, Bitcoin BTC with CPU RAM SSD: Computers & Accessories", Available Online at <https://www.amazon.com/SoonTech-Motherboard-Building-Ethereum-Bitcoin/dp/B08R6ZH31X/ref=sr_1_3?dchild=1&keywords=mining+rig&qid=1609299129&s=pc&sr=1-3>, Retrieved on Feb. 1, 2021, 11 pages.

Valentine, John, "Deep Dive into the AWS Nitro System—Kovarus", Blog, Available Online at <https://www.kovarus.com/blog/deep-dive-into-the-aws-nitro-system/>, Jan. 7, 2020, 6 pages.

Wiredzone.com, "Supermicro SBE-414E-222 Blade Enclosure", Available Online at <https://www.wiredzone.com/shop/product/10028076-supermicro-sbe-414e-222-blade-enclosure-5790>, Retrieved on Feb. 1, 2021, 2 pages.

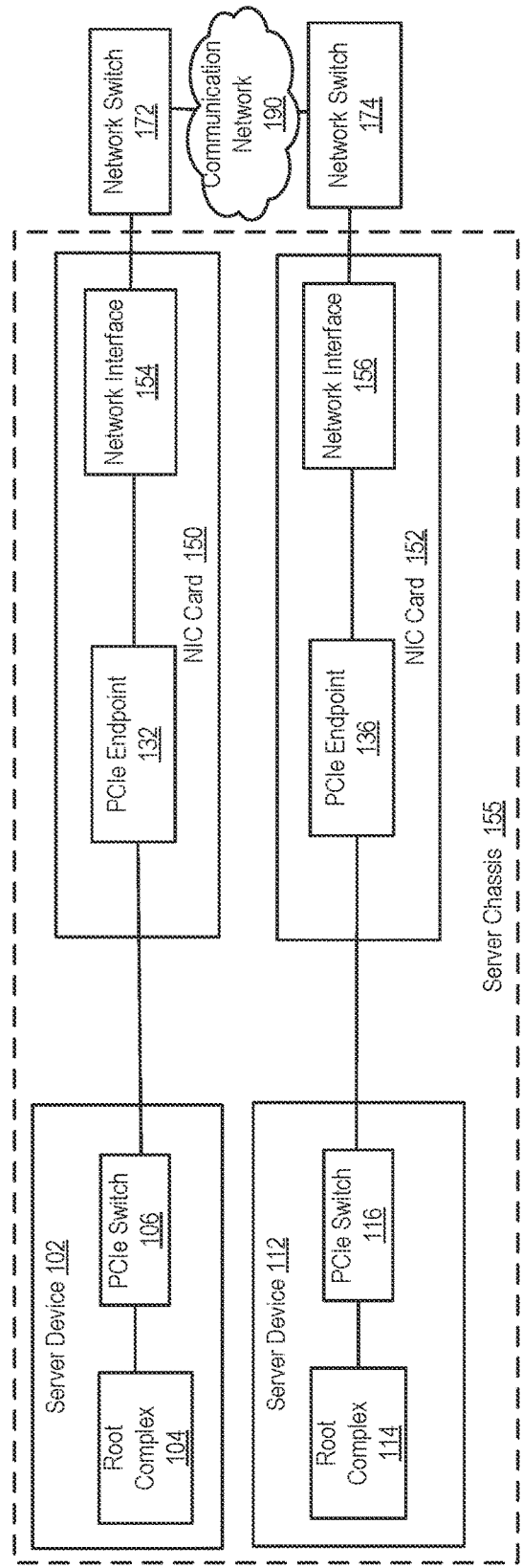
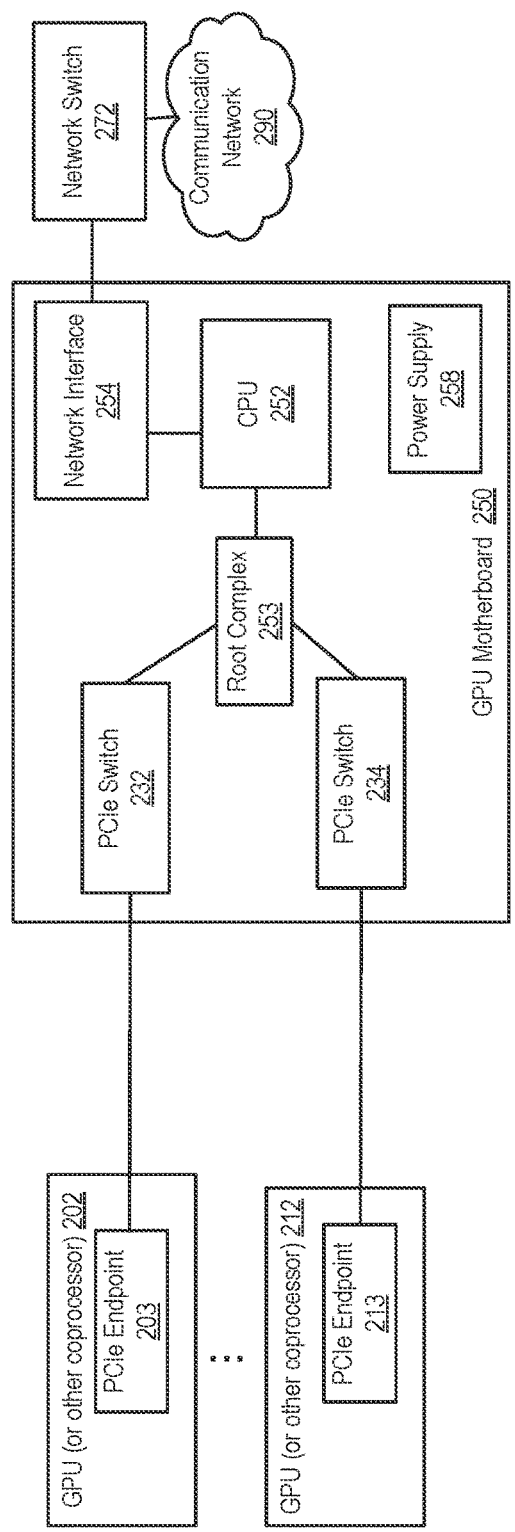
FIG. 1 (Prior Art)
FIG. 2

```
                                                        700

┌─────────────────────────────────────────────────────────────┐
│ Couple a plurality of component interconnect (PCI) interfaces of a PCI hosting device to │
│ the plurality of server devices, each PCI interface being designed to be coupled to one  │
│      server device from a plurality of server devices to the PCI hosting device. 702     │
└─────────────────────────────────────────────────────────────┘
                                 │
                                 ▼
┌─────────────────────────────────────────────────────────────┐
│ Register the PCI hosting device as a first PCI board of a first server device through a first │
│ PCI interface and as a second PCI board of a second server device through a second PCI   │
│ interface once the first and second server devices are coupled to the PCI hosting device. │
│                                  704                                                     │
└─────────────────────────────────────────────────────────────┘
                                 │
                                 ▼
┌─────────────────────────────────────────────────────────────┐
│ Supply power to the plurality of PCI interfaces independently from the plurality of server │
│                                devices. 704                                              │
└─────────────────────────────────────────────────────────────┘
                                 │
                                 ▼
┌─────────────────────────────────────────────────────────────┐
│  Forward packets between the network interface and the first server device, and the     │
│              network interface and the second server device. 708                         │
└─────────────────────────────────────────────────────────────┘
```

FIG. 7

PERIPHERAL COMPONENT INTERCONNECT (PCI) HOSTING DEVICE

RELATED APPLICATION

The present application is a continuation of U.S. application Ser. No. 17/316,710, filed on May 10, 2021, which application is incorporated herein by reference.

FIELD

The present invention relates to the field of computing; and more specifically, to aggregating traffic from multiple server devices through a peripheral component interconnect (PCI) hosting device.

BACKGROUND

Cloud computing and virtual computing environments provide remote computing resources and remote data storage resources in various applications. A cloud service provider may implement multiple server chassis that each contain many server devices to provide the cloud and virtual computing environment to its clients. These server devices may be connected to network switches, which then provide connectivity to a communication network (e.g., the Internet) for the server devices.

In some implementations, each server device is a blade server installed in a server rack. Multiple server devices may be included in an enclosure to provide high efficiency in the rack space usage. To handle network traffic between blade servers within an enclosure and a communication network, many network equipment vendors provide onboard network switches within the enclosure. Yet the onboard network switches may not provide the desired functionalities that clients or the cloud service provider prefer (e.g., quality of service monitoring or traffic encryption). Additionally, the cloud service provider may prefer not to be limited to a particular vendor to provide both blade servers and network switches.

FIG. 1 shows one way to connect server devices to a communication network bypassing onboard network switches. Server devices 102 and 112 are blade servers, and they can be installed within an enclosure (e.g., a server chassis 155), which may also include onboard network switches (not shown) that a cloud service provider prefers to bypass when server devices 102 and 112 connect to a communication network 190. Server device 102 connects to an associated network interface controller (NIC) card 150 (NIC may also stand for network interface card, and the terms of network interface controller and network interface card are used interchangeably), which in turn connects to a network switch 172 outside the server chassis 155. Similarly, server device 112 connects to its own associated NIC card 152, which in turn connects to a network switch 174. Both network switches 172 and 174 are then connected to the communication network 190. The network switches 172 and 174, which are outside of the server chassis 155, may be referred to as top-of-rack switches or off-shelf switches.

The connection between a server device 102, 112 and associated NIC card 150, 152 may use a peripheral component interconnect (PCI) architecture. PCI express (PCIe or PCI-e), a variation of the PCI architecture, is implemented to connect server devices 102/112 and NIC cards 150/152.

PCIe uses point-to-point links, where a root complex connects a processor (e.g., a central processing unit (CPU) or a graphics processing unit (GPU)) and memory of a server device to the PCI Express fabric. The root complex may have multiple ports (e.g., Ethernet ports), each port connecting to a PCIe switch or an endpoint (also referred to as an endpoint device, and the terms such as "PCIe endpoint," "endpoint," and "endpoint device" are used interchangeably). Each PCIe switch may further connect to one or more endpoints to form the PCIe connectivity hierarchy. The root complex generates transaction requests on behalf of the processor. In response to the processor's commands, the root complex generates configuration, memory, and input/output (I/O) requests. The root complex transmits PCI packets from its ports to endpoints or PCIe switches and also receives PCI packets which it then forwards to the appropriate memory or processor. Note that packets within this Specification refer to PCI packets and these two terms are used interchangeably unless otherwise noted, and PCI packets are packets transmitted through a PCI protocol. For example, the PCI packets may be transaction layer packets within the PCIe protocol.

As shown in FIG. 1, server device 102 includes root complex 104 and PCIe switch 106, and server device 112 includes root complex 114 and PCIe switch 116, but their respective processors, memory, and other components are not shown, as they are not pertinent to the network connectivity discussion. Each NIC card acts as a PCIe endpoint to its respective server device. A NIC card 150 has an interface connecting to the server device 102 so it acts as the PCIe endpoint 132, which connects to the PCIe switch 106 of the server device 102. The NIC card 150 also has a network interface 154 so that packets may be forwarded between server device 102 and network switch 172 through the network interface 154 of NIC card 150.

NIC card 152 can be designed similarly as NIC card 150, and forward packets between server device 112 and network switch 174 through PCIe endpoint 136 and network interface 156. Note that NIC cards 150 and 152 do not have power supplies to provide power independent from the server devices 102 and 112. Since they rely on the server devices 102 and 112 for power, NIC cards 150 and 152 are limited to the power consumption limit of a PCI board, in one embodiment based on PCIe standards such as the PCI Express Card Electromechanical Specification. Note that NIC cards 150 and 152 not only provide connectivity to server devices 102 and 112, but also may implement network traffic processing (e.g., encryption, firewall, Transmission Control Protocol and Internet Protocol (TCP/IP) and Hypertext Transfer Protocol (HTTP) processing) on the packets from/to the server devices 102 and 112, and they may be referred to as smart NIC cards due to their packet processing capabilities.

With each NIC card establishing a separate network connection between a server device and a network switch, a cloud server provider may bypass the onboard network switches and gain flexibility in managing server device connectivity. Yet multiple server devices are often deployed in a server chassis, adding one NIC card dedicated to each server device will increase the deployment costs quickly, take up precious chassis/rack space, and make managing the sprawling NIC cards unwieldy. A better way to manage network connectivity for multiple server devices in aggregation is preferable.

BRIEF DESCRIPTION OF THE FIGURES

The present invention is illustrated by way of example, and not by way of limitation, in the figures of the accompanying drawings and in which like reference numerals refer to similar elements and in which:

FIG. 1 shows one way to connect server devices to a communication network bypassing onboard network switches.

FIG. 2 shows an exemplary configuration of a graphics processing unit (GPU) motherboard hosting multiple GPUs.

FIG. 7 is a flow diagram illustrating the method of using the PCI hosting device to host a plurality of service devices per some embodiments.

DETAILED DESCRIPTION

Figure 3:
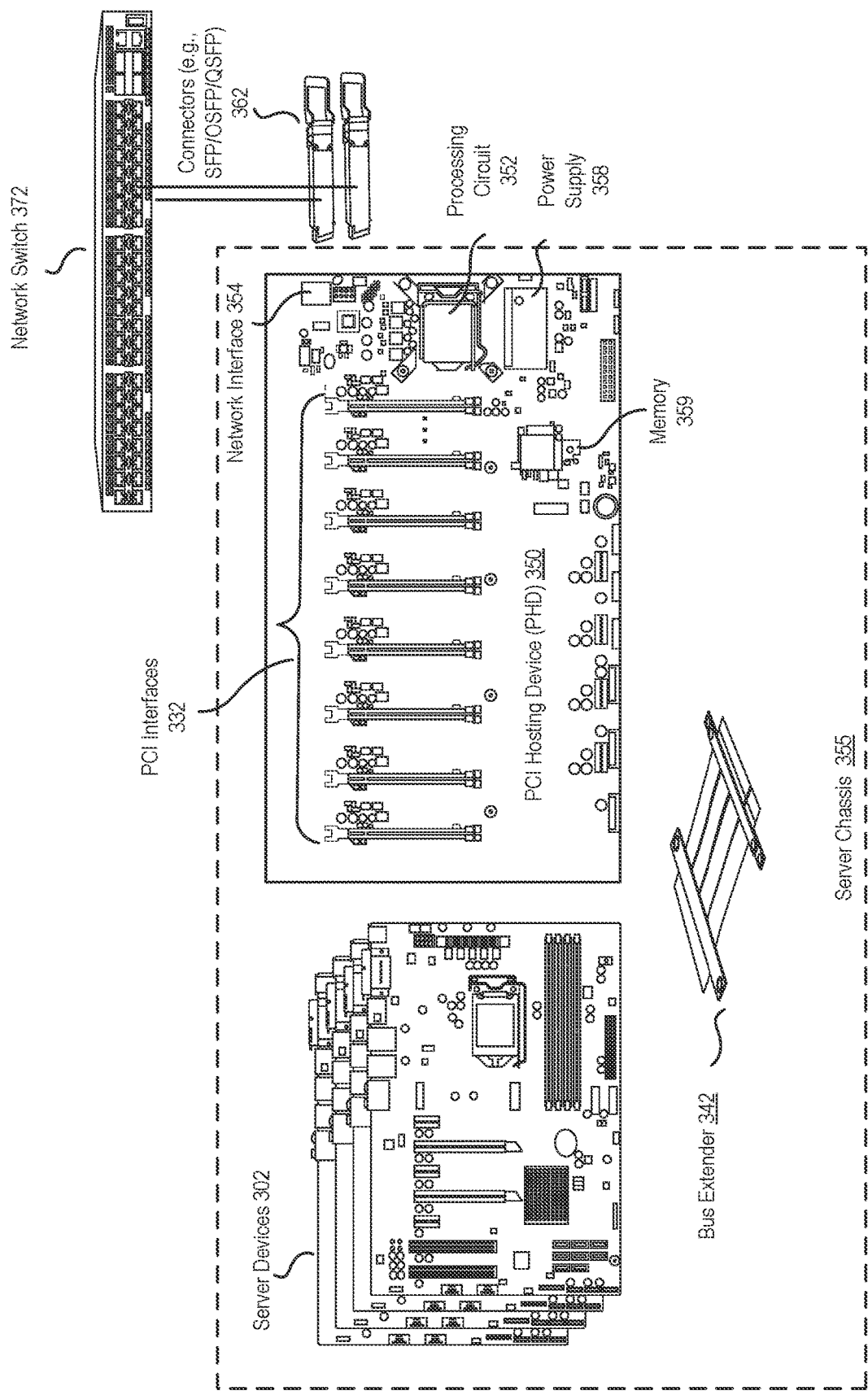
FIG. 3 is an illustration of devices to implement a PCI hosting device hosting multiple server devices per some embodiments.

Embodiments of the invention provide a peripheral component interconnect (PCI) hosting device comprising a plurality of PCI interfaces to host a plurality of server devices, a network interface to couple the PCI hosting device to a network, a processing circuit to forward the packets, and a power supply to supply power to the plurality of PCI interfaces independently from a plurality of server devices. Each PCI interface is designed to couple one server device to the PCI hosting device. The PCI hosting device is registered as a PCI board for a first server device through a first PCI interface and as a PCI board for a second server device through a second PCI interface, once the first and second server devices are coupled to the PCI hosting device. The PCI hosting device is designed to forward packets between the network interface and the first server device, and the network interface and the second server device.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized, and that logical, mechanical, electrical, functional, and other changes may be made without departing from the scope of the present invention. The following detailed description is, therefore, not to be taken in a limiting sense, and the scope of the present invention is defined only by the appended claims.

References in the specification to "one embodiment," "an embodiment," "an example embodiment," and so forth indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The description and claims may use the terms "coupled" and "connected," along with their derivatives. These terms are not intended as synonyms for each other. "Coupled" is used to indicate that two or more elements, which may or may not be in direct physical or electrical contact with each other, co-operate or interact with each other. "Connected" is used to indicate the establishment of wireless or wireline communication between two or more elements that are coupled with each other. A "set," as used herein, refers to any positive whole number of items including one item.

Using a dedicated NIC card (e.g., a smart NIC card) to establish a network connection for each server device in a multi-server chassis can be wasteful and unwieldy. It is preferable to have a single device establish network connections for multiple server devices. The present system utilizes a PCI hosting device to enable this.

FIG. 2 shows a graphics processing unit (GPU) motherboard hosting multiple GPUs. A GPU motherboard 250 includes a central processing unit (CPU) 252, a network interface 254, a root complex 253, PCIe switches 232 and 234, and a power supply 258. Unlike the NIC cards in FIG. 1, the GPU motherboard 250 is an active device with the power supply 258 providing power to entities on the motherboard 250. Similar to the network interfaces 154/156, network interface 254 is coupled to a network switch 272, which in turn forwards traffic between network interface 254 and communication network 290.

The root complex 253 connects to the PCIe switches 232 and 234, which are connected to GPUs 202 and 212, respectively, once GPUs 202 and 212 are powered on and plugged in the PCIe slots (also referred to as sockets) corresponding to the PCIe switches 232 and 234. Each of the GPUs 202 and 212 may be registered as a PCI board of the GPU motherboard 250 once it is plugged in a PCIe slot of the GPU motherboard 250, and it becomes a PCIe endpoint (PCIe endpoint 203 and 213, respectively) connecting with the root complex 253. These GPUs may operate as coprocessors of CPU 252 to perform tasks allocated by CPU 252.

GPU motherboards such as GPU motherboard 250 have been used to build mining rigs in cryptocurrency applications. Such GPU motherboards are efficient in cryptocurrency mining as the computational goal is singular and can be managed efficiently by a CPU 252 acting as the main processor and using GPUs 202 and 212 as coprocessors. As the main processor, CPU 252 determines tasks to be performed, performs some tasks, and allocates others to GPUs 202 and 212 as coprocessors when needed (the allocation may be referred to as load sharing/balancing). GPUs 202 and 212 are dedicated to the allocated tasks and provide their results to the main processor.

However, the GPU motherboard 250 configuration is not suitable for other functions, such as hosting server devices in a server chassis, because in that configuration server devices are required to perform various tasks. For hosting services, for example, the server devices perform a variety of tasks for the clients of the cloud service provider, since the clients lease the computational resources of the server devices. With the GPUs 202 and 212 operating as coprocessors of the CPU 252 (instead of the main processors to provide services), their functionalities are curtailed. Additionally, for security purposes, some operations may be best run on an isolated server device without the knowledge of any other device in the chassis such as the CPU in a GPU motherboard 250 configuration. With the CPU 252 operating as the main processor, it is not possible to isolate packet processing on the GPUs 202 and 212 from the processes on the GPU motherboard 250, and also keep packet processing on the GPUs 202 and 212 outside of the purview of the cloud service provider (which would control a hosting device such as the GPU motherboard 250).

In other words, for cloud computing, it is preferable for the server devices to be the main processors for the clients. Furthermore, the ability to isolate the servers is advantageous. The configuration in FIG. 2, which treats the GPUs 202 and 212 as coprocessors of the GPU motherboard 250, does not work well in aggregating traffic from multiple server devices for cloud computing.

FIG. 3 is an illustration of devices to implement a PCI hosting device hosting multiple server devices per some embodiments. An enclosure 355 may be used. A PCI hosting device 350, one or more server devices 302, and one or more optional bus extenders 342 (e.g., a bus extender card/device) may be included within the enclosure 355. The enclosure 355 may be a server chassis or server cabinet, for example.

Each of the server devices 302 may be a blade server (also referred to as server blades, or server units) with a modular design optimized to minimize the use of physical space and energy. In an alternative embodiment, the server devices 302 may also be rack servers or tower servers that are outside of the enclosure 355 (e.g., the server devices 302 may be individually enclosed or on a server rack without an enclosure enclosing multiple server devices 302).

Each of the server devices 302 may include: one or more dedicated processors or processing units, one or more memories, one or more input/output devices, and/or other components of a typical computing device. Each server device includes one or more edge connectors to couple the server device 302 to the PCI hosting device 350. The PCI hosting device 350 may aggregate traffic from the multiple server devices 302 to a network switch 372, which in turn forwards the traffic to a communication network, similar to network switches 172/174 discussed above.

The PCI hosting device 350 has a processing circuit 352, a network interface 354, multiple PCI interfaces 332, a power supply 358, and memory 359, all of which may be integrated onto a motherboard in some embodiments. The PCI hosting device 350 may have an architecture the same as or similar to that of a server device in some embodiments. A PCI hosting device may also be referred to as a PCI hosting board, and when a particular PCI protocol is implemented, it may be referred using the protocol, such as PCIe hosting device/board.

Some or all of the multiple PCI interfaces 332 include a PCI slot on the motherboard in some embodiments. The number of PCI interfaces may be the multiples of 2 such as 4, 8, 16, or 32. The network interface 354 may include multiple physical interfaces, each providing some bandwidth, and in some embodiments each physical interface provides a bandwidth of 10, 25, 100 Gbps, or another bandwidth. Each physical interface may be coupled to a different network switch slot of network switch 374 or to another network switch (not shown).

The network interface 354 may be connected to the network switch 374 or another network switch through one or more connectors 362. Each of the connectors 362 may be a small form-factor pluggable (SFP) transceiver, a quad SFP transceiver (QSFP), an octal SFP (OSFP) transceiver, or another type of transceiver. Each of the set of connectors 362 may be connected to the network switch 372 through fiber-optic cables or coaxial cables.

While network switch 372 is used as an example of a device through which the server devices 302 connect to a communication network, other network devices such as one or more network routers may be used alternatively or additionally to forward packets to or from the server devices 302.

In some embodiments, some or all of the multiple PCI interfaces 332 are isolated from each other so that the packets from one server device are processed separately from packets from another server device. One server device of the server devices 302 thus has no access to packets generated by another server device in these embodiments. The packets may be processed at the PCI hosting device 350, but the server device may add encryption so that the content of the packets is not readable by the PCI hosting device 350. In one embodiment, each server device from the server devices 302 treats the PCI hosting device 350 as a PCI board dedicated to the server device, and the server device is unaware that there may be other server devices that also treat the PCI hosting device 350 as their dedicated PCI board.

The isolation of the packets from different server devices at the PCI hosting device 350 provides privacy/security protection of clients of a cloud service provider, and the isolation can be achieved through isolating PCI slots on the motherboard. Additionally, the PCI hosting device 350 may configure the PCI slots so that a server device coupled to one PCI slot cannot access packets from another server device coupled to another PCI slot through a PCI bus on the PCI hosting device 350.

Each PCI interface of the multiple PCI interfaces 332 is designed to couple one server device from server devices 302 to the PCI hosting device 350. For example, the PCI hosting device 350 can be registered as a first PCI board of a first server device through a first PCI interface and as a second PCI board of a second server device through a second PCI interface when the first and second server devices are coupled to the PCI hosting device. More details about embodiments of the registration process will be discussed below. In one embodiment, a PCI interface is activated when a server device 302 is coupled to the PCI interface 332 of the PCI hosting device 350, and the PCI hosting device 350 is registered as a PCI endpoint of the server device.

The PCI hosting device 350 is designed to forward packets between the network interface 354 and the first server device, and the network interface 354 and the second server device. The coupling of a server device to the PCI hosting device 350 may be through plugging the server device into a PCIe slot of the PCI hosting device 350, either directly or when the server device is too far away from the PCI hosting device 350, the server device may be connected to bus extender 342, which is then connected to a PCIe slot of the PCI hosting device 350. The bus extender 342 may be connected to a PCIe slot of a server device of server devices 302. In some embodiments, a PCIe adapter may also be used to connect a server device and the PCI hosting device 350 to address physical interface compatibility issues between the server device and the PCI hosting device 350.

Each PCI interface of the multiple PCI interfaces 332 may emulate one or more virtual PCI interfaces on one of the server devices 302 once the PCI hosting device 350 is registered as a PCI board of the server device. The virtual interface is virtual as the PCI interface is not physically on the server device, but the server device treats the PCI interface, which is on the PCI hosting device 350, as one or more Ethernet ports (each virtual interface corresponding to one Ethernet port) on the server device, and the PCI hosting device 350 is treated as one or more endpoints (each endpoint corresponding to one virtual interface) on each of the server devices. The emulation of multiple virtual interfaces based on a single PCI interface may be accomplished through executing software on the PCI hosting device 350 to distribute packets from a server device to the multiple virtual interfaces. In one embodiment, the emulation of the multiple virtual interfaces by the single PCI interface may use one or more virtual buffers or one or more virtual functions (VFs) or physical functions (PFs) provided by the single PCI interface.

In one embodiment, the PCI hosting device 350 forwards the packets between the network interface 354 and first/second server devices through the processing circuit 352. The processing circuit 352 may be a central processing unit (CPU), a graphics processing unit (GPU), an application-specific integrated circuit (ASIC), a field-programmable gate array (FPGA), or another type of processing unit.

The processing circuit 352 may provide basic packet forwarding as well as enhanced packet processing features/services. The enhanced packet processing features/service may include one or more features/services selected from among: firewall, network access control list (ACL), direct memory access (DMA) and remote DMA (RDMA), metering, non-volatile memory express (NVMe), encryption, and/or quality of service (QoS) control. The enhanced packet processing features may be available and performed on per PCI interface basis in some embodiments.

The processing circuit 352 may initiate PCI interface resources on the PCI hosting device 350 before presenting a virtual interface to a server device. The PCI interface resources to be initiated include some or all of the following:
  for storing packets/processing information: a number of packet buffers, a number of queues, a storage (e.g., RAM) size, or a cache size;
  for packet processing: a number of processing cores/clusters/threads; and
  for management: a namespace associated with the PCI interface.

The processing circuit 352 can process packets across PCI interfaces when the PCI interfaces are activated, and it may allocate physical or logical resources of the PCI hosting device 350 (e.g., the PCI interface resources discussed and input/output devices of the PCI hosting device) to each PCI interface coupled to a server device as well. For example, the processing circuit 352 may allocate a region of memory 359 to a first server device and a separate region of memory 359 to a second server device, and neither server device is granted access to the region of memory allocated to another server device. In one embodiment, the processing circuit 352 may enforce the isolation between the server devices 302.

Note that memory 359 is merely an example of a storage device on the PCI hosting device 350, and the PCI hosting device 350 may include other storage devices, which may include any device readable media such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical, or other form of propagated signals—such as carrier waves, infrared signals). The PCI hosting device 350 may include non-volatile (non-transitory) memory containing code (which is composed of software instructions and which is sometimes referred to as a computer program code or a computer program) for the PCI hosting device 350 to perform tasks since code/data can persist in the non-volatile memory even when the PCI hosting device 350 is turned off (when power is removed). When the PCI hosting device 350 is turned on, that part of the code that is to be executed by the processing circuit 352 is typically copied from the slower non-volatile memory into volatile memory (e.g., dynamic random-access memory (DRAM), static random-access memory (SRAM)) of the PCI hosting device 350. The machine-readable storage media may include instructions to perform operations described herein.

While the embodiments of the invention are not limited to a particular variation of the PCI protocol, implementation details are explained using PCIe as an example. Other PCI protocol variations such as PCI extended (PCI-X) can be used with the PCI hosting devices such as the PCI hosting device 350 to aggregate traffic from multiple server devices as well. Also, PCIe has multiple versions in use in the industry, including PCIe versions 1.0 to 6.0, and embodiments of the invention may be implemented using current and/or future versions of the standards. Additionally, alternative standards, now known or later introduced, may be used.

Note that in contrast to FIG. 2, where the GPUs 202 and 212 are registered as PCI boards of the GPU motherboard 250 and the CPU 252 delegates tasks (e.g., packet processing) to the GPUs 202 and 212, the PCI hosting device 350 is a PCI board of the server devices 302, and the processing circuit 352 processes packets for the server devices 302. With this configuration, the server devices 302 may perform various tasks for the clients. In one embodiment, the server devices 302 may delegate tasks to the processing circuit 352. The configuration in FIG. 3 thus overcomes the deficiency of the GPU motherboard 250 configuration discussed above.

The PCI hosting device 350, in contrast with the NIC cards 150/152 in FIG. 1, can forward packets for multiple server devices (instead of permitting only one server device per NIC card). Additionally, with the processing circuit 352 providing enhanced packet processing features, the PCI hosting device 350 may provide better management capability for supporting a set of independent server devices 302. This is particularly useful for cloud service providers. Furthermore, the PCI hosting device 350 is an active device with its own power supply 358, which supplies power to the PCI interfaces 332 independent from the server devices 302. Thus, the power consumption of the PCI interfaces 332 on the PCI hosting device 350 may exceed the limitations of the PCI standards.

Figure 4:
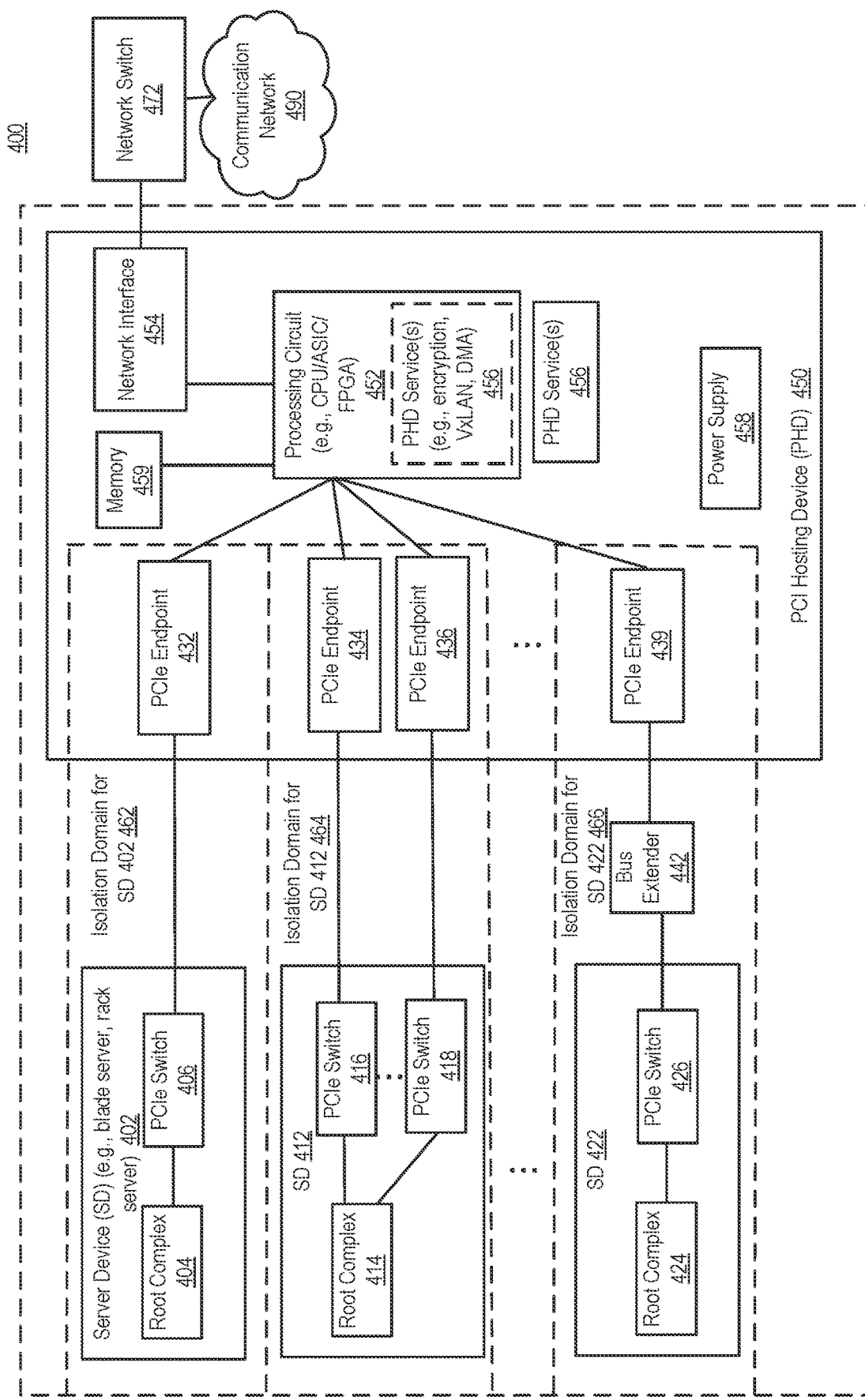
FIG. 4 shows a PCI hosting device hosting multiple server devices based on the PCIe protocol per some embodiments.

FIG. 4 shows a PCI hosting device hosting multiple server devices per some embodiments. In one embodiment, the protocol used is based on the PCIe protocol in some embodiments. System 400 includes a PCI hosting device (PHD) 450, a network switch 472, and a communication network 490. The PCI hosting device (PHD) 450 comprises a processing circuit 452, a network interface 454, and a power supply 458. The network interface 454 couples to the network switch 472, which in turn couples to the communication network 490.

As explained above, the PCIe protocol uses point-to-point links to communicate, and a root complex coordinates transactions for a processor and corresponding memory through PCIe switches and endpoints. In some embodiments, each of the PCI interfaces, or PCIe endpoints 432, 434, 436, 439 on the PCI hosting device 450 is registered as a PCIe endpoint of a server device 402, 412, 422 that is coupled to the PCI hosting device 450 once the PCI hosting device 450 is coupled to the server device. The coupling causes the PCI hosting device 450 to initiate a driver software in the server device and the driver software is then executed to activate the PCI hosting device 450 as the PCIe endpoint of the server device.

In the example shown in FIG. 4, server device 402 includes a root complex 404 and a PCIe switch 406, and the PCI interface on the PCI hosting device 450 is registered as an endpoint of the server device 402. The PCIe endpoint 432 provides a virtual interface to the server device 402, and the server device 402 treats the PCI hosting device 450 as a dedicated PCI board. Server device 402 and the PCIe endpoint 432 are included in an isolation domain 462 that is separated from other server devices and their corresponding endpoints. The packets in the isolation domain 462 are not available to the other server devices outside of the isolation domain (e.g., for access/inspection). In some embodiments, more than one PCIe endpoint may be within a single isolation domain (e.g., see the isolation domain 464), and further the PCI hosting device 450 may switch packets among the multiple isolation domains. Note that in one embodiment each PCIe endpoint is set to be an isolation domain separated from another PCIe endpoint by default, but the PCI hosting device 450 may configure multiple PCIe endpoints to be within the same isolation domain.

Figure 5:
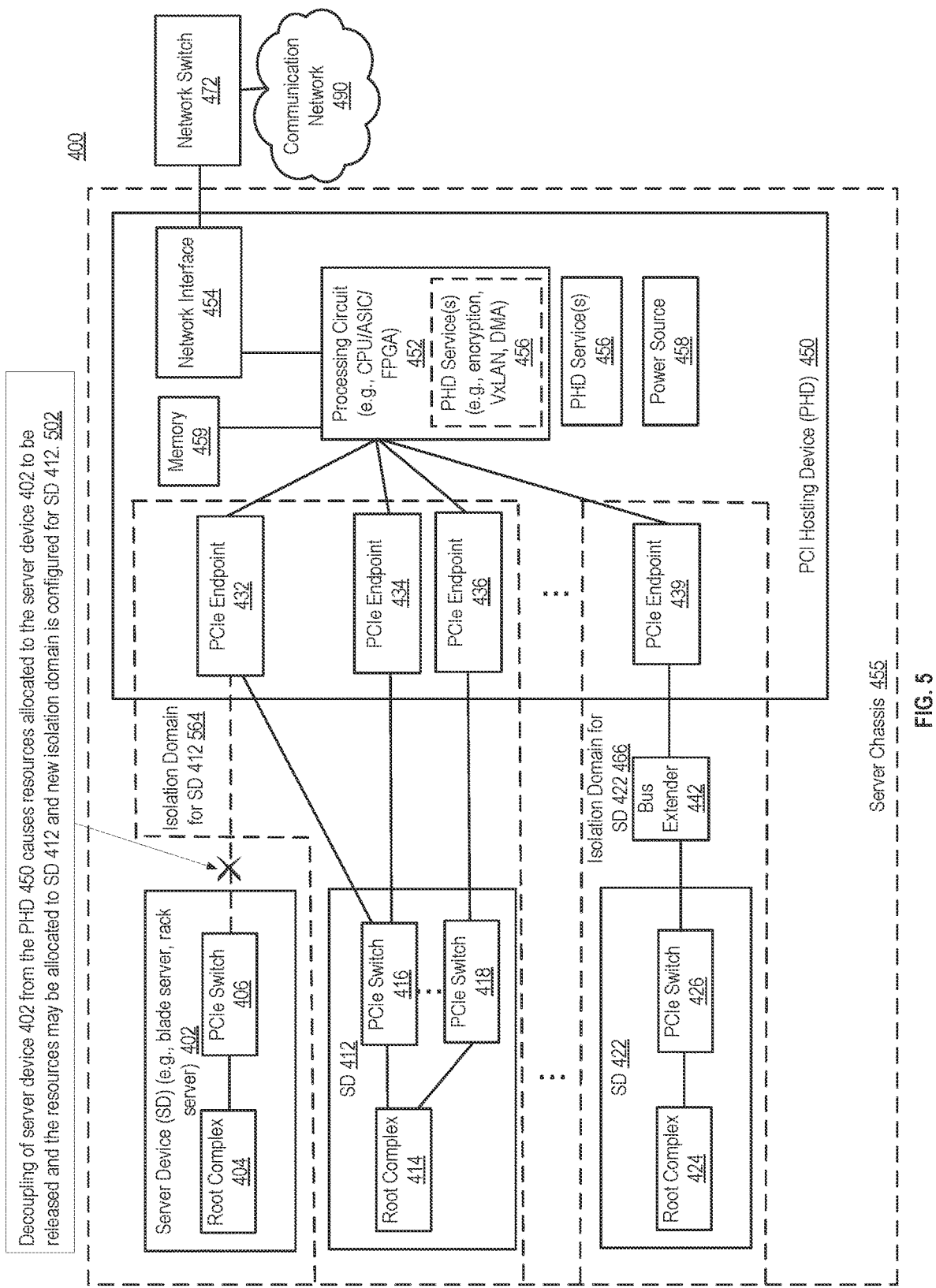
FIG. 5 shows dynamic resource allocation of a PCI hosting device per some embodiments.

A PCI hosting device may emulate two or more endpoints for a single server device, in one embodiment. For example, as shown in FIG. 5, the PCI hosting device 450 may register itself as two PCIe endpoints 434 and 436 for the server device 412. In this example, the two PCIe endpoints 434 and 436 are coupled to a PCIe switches 416 and 418 in server device 412, respectively. In one embodiment, the server device 412 and the corresponding PCIe endpoints 434/436 are included in the isolation domain 464.

A PCI hosting device may be coupled to a server device through a bus extender or a PCIe adapter. For example, the PCI hosting device 450 registers itself as a PCIe endpoint 439 on the server device 422, once the PCI hosting device 450 is coupled to the server device 422 through bus extender 442. In one embodiment, the server device 422, the corresponding bus extender 442, and the PCIe endpoint 439 are included in an isolation domain 466. Note that multiple bus extenders may couple a server device to a PCIe hosting device. For example, one bus extender may couple the server device 412 to a first PCIe slot (PCIe endpoint 434), and another bus extender may couple the server device 412 to another PCIe slot (PCIe endpoint 436).

The PCI hosting device 450 also includes memory 459 and power supply 458. Optionally, the PCI hosting device 450 includes a separate hardware circuit and/or software module, PCI hosting device (PHD) service(s) module 456, to provide one or more services to processing circuit 452 to process the packets to or from the multiple server devices 402, 412, and 422. The module 456 may be included within processing circuit 452, in one embodiment. Additionally or alternatively, a service module 456 may be in a separate system outside the processing unit. In some embodiments, memory 459 may be coupled to the processing circuit 452, and the processing circuit 452 may allocate different regions of memory 459 to different server devices. Power supply 458 supplies power to the PCIe endpoints 432 to 439 independently from the server devices 402, 412, and 422.

In one embodiment, a PCI hosting device 450 may dynamically allocate resources to server devices as the server devices are coupled and decoupled to the PCI hosting device 450. For example, a PCI hosting device may allocate its physical and/or logical resources to a server device once the PCI hosting device is coupled to the server device and registered as a PCI board on the server device. The physical or logical resources may then be used to process packets to and from the server devices. When the PCI hosting device is removed from the server device, the allocated physical or logical resources may be released. Another server device may be coupled to the PCI hosting device through the PCI interface, and once the PCI hosting device is registered as a PCI board in the new server device, the PCI hosting device may allocate the same or different physical or logical resources to the PCI interface to process packets to and from the new server device.

FIG. 5 shows dynamic resource allocation of a PCI hosting device per some embodiments. FIG. 5 is similar to FIG. 4 and the same references indicate elements or components having the same or similar functionalities. As shown at reference 502 in FIG. 5, server device 402 is removed from the PCI hosting device 450 (e.g., server device 402 is unplugged from the PCIe endpoint 432 of PCI hosting device 450).

Once server device 402 is removed, the physical/logical resources on the PCI hosting device 450 allocated to the PCIe endpoint 432 for server device 402 are released. Other server devices may be coupled to the PCI hosting device 450 through the PCI interface corresponding to the PCIe endpoint 432. In this example, server device 412 couples to the PCI interface and the PCI hosting device 450 is then registered as PCIe endpoint 432 of server device 412. The PCI hosting device 450 allocates physical/logical resources on the PCI hosting device 450 for the endpoint 432, which now belongs to the updated isolation domain of server device 412—now referred to as isolation domain 564.

For example, a dedicated memory region in the PCI hosting device 450 may be allocated to server device 402 when the PCIe endpoint 432 is within the isolation domain 462, and the dedicated memory region is released after server device 402 is removed from the PCI hosting device 450. The released memory region may then be allocated to server device 412 when the PCIe endpoint 432 is registered to the server device 412 and become a part of the isolation domain 462.

Note that both PCIe endpoints 432 and 434 are connected to the same PCIe switch 416. That is, the PCI hosting device 450 may emulate two or more PCIe endpoints of a server device. The server device consumes/takes over two or more corresponding PCI interfaces (e.g., running one or more extenders to the PCI interfaces, one each for a PCI interface) on the PCI hosting device 450 in one embodiment.

When a server device is removed from the PCI hosting device, its resources are deallocated (e.g., released to the resource pool) and the memory and other non-physical resources may be allocated to one of the remaining server devices, without requiring that an additional PCIe endpoint be coupled to the remaining server device(s).

Figure 6:
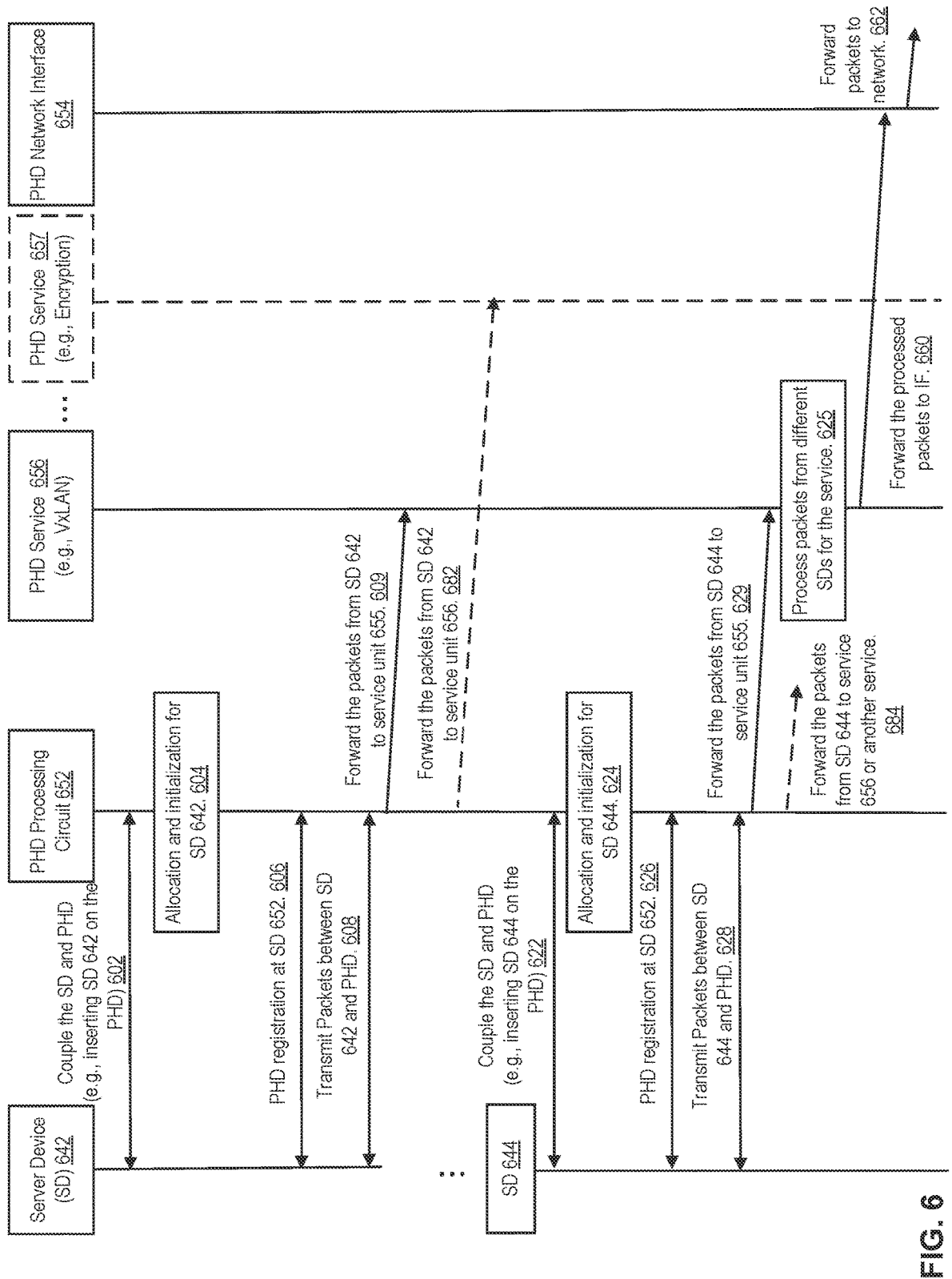
FIG. 6 shows a PCI hosting device providing services to the server devices per some embodiments.

FIG. 6 shows signal diagram of one embodiment of a PCI hosting device providing services to server devices. The PCI hosting device (PHD) comprises the PCI hosting device 350 or 450 in some embodiments. Several functional components of the PCI hosting device are shown in FIG. 6, including the PCI hosting device processing circuit 652, PCI hosting device service 656 (e.g., virtual extensible local area network (VxLAN)), PCI hosting device service 657 (e.g., encryption), and PCI hosting device service network interface 654. These components have the same or similar functionalities as those of components with similar references as the PCI hosting device processing circuit 352/452, PCI hosting device service 456, and network interface 454. The system may include additional services, in some embodiments, such as firewall, DMA, and ACL, as discussed above, and optionally other services.

At reference 602, server device 642 and the PCI hosting device are coupled. The coupling may be performed through the server device 642 being powered on and inserted into a slot on the PCI hosting device. The server device 642 is then detected by the PCI hosting device processing circuit 652. At reference 604, the PCI hosting device processing circuit 652 allocates physical and logical resources of the PCI hosting device for the server device 642. These resources may be initiated first according to the corresponding PCI interface (e.g., PCI slot) through which the server device 642 is coupled before they are allocated to the server device 642. The resources may include memory and other resources. In one embodiment, the PHD processing circuit at reference 604 also creates the isolation domain for the server device 642.

At reference 606, the PCI hosting device processing circuit 652 then registers the PCI hosting device at the server device 642. During the registration, the PCI hosting device processing circuit 652 may identify driver software on the server device and initiate the execution of the driver software to activate the PCI hosting device as a PCIe endpoint of the server device 642.

Once the PCI hosting device is registered as the PCIe endpoint, it emulates a PCI interface (virtual interface) on the server device 642 and packets may be transmitted between the server device 642 and the PCI hosting device at reference 608. The PCI hosting device processing circuit 652 processes packets to and from the server device 642 for the PCI hosting device.

Similarly, server device 644 and the PCI hosting device may be coupled at reference 622, the PCIe endpoint is registered at the server device 644 at reference 626, and packets may then be transmitted between the server device 644 and the PCI hosting device at reference 628. Each server device may be allocated a separate isolation domain in some embodiments, so that the packets for one server device at the PCI level won't be exposed to another server device.

The PCI hosting device processing circuit 652 may provide one or more services to the packets for server devices. Each service may be implemented using separate hardware circuit and/or software module (e.g., the service modules 456/656/657). At reference 609, packets from the server device 642 are forwarded to service module 656.

At reference 629, the packets from the server device 644 are forwarded to the same service module 656. At reference 625, packets from different server devices are processed by the service 656. For example, when VxLAN service is offered through the service module 656, VxLAN packet headers are encapsulated on the received packets, based on the sourcing server devices—different server devices may be assigned to different VxLAN network identifiers (VNIs). The packets from a server device (e.g., transaction layer packets (TLPs)) may be encapsulated as VxLAN packets with a VNI allocated to the server device and forwarded to the network interface 654. Since packets from different server devices have VNIs identifying their source server devices, they may be forwarded to the network interface 654 in aggregation at reference 660 and these packets may be processed separately based on the needs for the different server devices.

Similarly, encryption may be offered through the service module 657, and packets from different server devices may be encrypted using different encryption mechanisms and/or keys (symmetric keys, asymmetric key pairs, or other types of encryption). The different encryption mechanisms allow each server device to maintain its privacy apart from the other server devices that the PCI hosting device hosts.

The packets from the server devices 642 and 644 may be processed by the services as shown or other services (e.g., advanced packet processing features/services such as ACL, DMA, metering, NVMe, QoS control, etc.). The processed packets are then forwarded to a communication network through the network interface 654 at reference 662. Although not shown, packets received by network interface 654 may be processed by services 656/657 and then forwarded to the appropriate destination server devices, where in one embodiment the appropriate portion of the PCI hosting device identifies the destination server device for each packet based on packet headers (e.g., VNIs discussed above), encryption keys, or other information.

FIG. 7 is a flow diagram showing the operations of method to host a plurality of server devices by a PCI hosting device, per some embodiments. The method 700 may be performed by a PCI hosting device such as PCI hosting device 350 or 450. In some embodiments, the method is performed by a processing circuit such as the processing circuit 352 or 452 on a PCI hosting device.

At reference 702, a plurality of component interconnect (PCI) interfaces of a PCI hosting device are coupled to a plurality of server devices. In one embodiment, each PCI interface is coupled to a server device, such that the PCI hosting device is coupled to a plurality of server devices. As noted above, in some embodiments, a single server device may be coupled to multiple PCI interfaces. The coupling of the PCI interfaces to the plurality of service devices is discussed above.

At reference 704, the PCI hosting device is registered as a first PCI board of a first server device through a first PCI interface and as a second PCI board of a second server device through a second PCI interface, once a first and second server devices are coupled to the PCI hosting device. Note that although this discusses two server devices, a real implementation may include between one and ten server devices coupled to a single PCI hosting device with between two and fifteen PCIe endpoints, in one embodiment.

At reference 706, power is supplied to the occupied PCI interfaces independently from the associated server devices. In some embodiments, a power supply such as the power supplies 358 and 458 may provide the power to the PCI interfaces. Note that the power supply may not provide power to the PCI interfaces that are unoccupied (e.g., unused PCIe slots) to save power.

At reference 708, packets are forwarded between the network interface and the first server device, and the network interface and the second server device. One embodiment of the packet forwarding is discussed above.

In some embodiments, each of the first and second PCI boards is a PCI express (PCIe) board, and the PCI hosting device registers itself as an endpoint of the first server device and the second server device.

In some embodiments, a first dedicated memory region in the PCI hosting device is allocated to the first server device when the first server device is coupled to the PCI hosting device, and a second dedicated memory region in the PCI hosting device is allocated to the second server device when the second server device is coupled to the PCI hosting device.

In some embodiments, the plurality of PCI interfaces further comprises a third PCI interface, where the PCI hosting device is registered as an additional endpoint of the second server device as shown in FIG. 4. In some embodiments, the endpoints are coupled to separate PCIe switches on the second server device, as shown in FIG. 5.

In some embodiments, the PCI hosting device is activated as an endpoint of the first server device upon a corresponding driver software being executed in the first server device, as discussed above.

In some embodiments, a first dedicated memory region in the PCI hosting device is allocated to the first server device when the first server device is coupled to the PCI hosting device, and a second dedicated memory region in the PCI hosting device is allocated to the second server device when the second server device is coupled to the PCI hosting device. When the first server device is removed from the PCI hosting device, the first dedicated memory region in the PCI hosting device is released. In one embodiment, the memory region may be allocated to another server device, as discussed above.

In some embodiments, the PCI hosting device comprises a motherboard, and each of the plurality of PCI interfaces comprises a PCI slot on the motherboard. In some embodiments, each PCI slot is physically isolated from another PCI slot on the motherboard.

In some embodiments, the PCI hosting device comprises a bus extender to couple a third PCI interface in the PCI hosting device, where the bus extender is designed to be connected to a server device. The PCI hosting device is registered as a third PCI board of a third server device. The bus extender is the bus extender 342 or 442 in some embodiments.

In some embodiments, the PCI hosting device emulates a first Ethernet port of the first server device through the first PCI interface and a second Ethernet port of the second server device through the second PCI interface.

In some embodiments, each of the first and second server devices is a blade server or a rack server, as discussed above.

In some embodiments, forwarding the packets comprises encapsulating packets from the first server device with a first virtual extensible local area network (VxLAN) packet header allocated to the first server device and encapsulating packets from the second server device with a second VxLAN packet header allocated to the second server device. In some embodiments, forwarding the packets comprises encrypting packets from the first server device with a first encryption key allocated to the first server device and encrypting packets from the second server device with a second encryption key allocated to the second server device. Other types of packet processing, now known or later invented, may be applied to the packets from other server prior to forwarding the packets to the network, and to packets from the network destined for the server. Some packet processing processes are discussed above.

It will be apparent to those of ordinary skill in the art that the system, method, and process described herein can be implemented as software stored in memory on a PCI hosting device such as memory 359 or 459. This control logic or software may also be resident on an article of manufacture comprising a computer readable medium having computer readable program code embodied therein and being readable by the memory and for causing a processing circuit such as the processing circuit 352 or 452 on a PCI hosting device to operate in accordance with the methods and teachings herein.

It will be appreciated by those of ordinary skill in the art that any configuration of the particular machine implemented as the computer system such as a PCI hosting device may be used according to the particular implementation. The control logic or software implementing the present invention can be stored on any machine-readable medium locally or remotely accessible to a processing circuit such as the processing circuit 352 or 452 on a PCI hosting device. A machine-readable medium includes any mechanism for storing information in a form readable by a machine (e.g., a computer). For example, a machine-readable medium includes read-only memory (ROM), random access memory (RAM), magnetic disk storage media, optical storage media, flash memory, or other storage media which may be used for temporary or permanent data storage. In one embodiment, the control logic may be implemented as transmittable data, such as electrical, optical, acoustical, or other forms of propagated signals (e.g., carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A peripheral component interconnect (PCI) hosting device, comprising:
   one or more network interfaces to couple the PCI hosting device to a network;
   a plurality of PCI interfaces,
      each PCI interface designed to be coupled to one server device from a plurality of server devices, and
      the PCI hosting device is registered as a first PCI board for a first server device through a first PCI interface and as a second PCI board for a second server device through a second PCI interface once the first and second server devices are coupled to the PCI hosting device;
   a processing circuit to forward packets in PCI express (PCIe) protocol between the network and a first domain that includes the first server device and the first PCI interface, and between the network and a second domain that includes the second server device and the second PCI interface, wherein packets in each of the first and second domains are unavailable to server devices outside that domain; and
   a power supply to supply power to the plurality of PCI interfaces independently from one or more power supplies to supply power to the plurality of server devices.

2. The PCI hosting device of claim 1, wherein the PCI hosting device is registered as a third PCI board for a third server device through a third PCI interface, wherein the third server device and the third PCI interface are included in the first domain.

3. The PCI hosting device of claim 1, further comprising:
   a bus extender to couple a third PCI interface in the PCI hosting device, wherein the bus extender is designed to be connected to a third server device, wherein the PCI hosting device is registered as a third PCI board for a third server device, and wherein the third server device, the third PCI interface, and the bus extender are included in a third domain, packets in which are not unavailable to service devices outside of the third domain.

4. The PCI hosting device of claim 1, wherein the PCI hosting device switches packets between the first domain and the second domain.

5. The PCI hosting device of claim 1, wherein each of the first and second PCI boards is a PCI express (PCIe) board, and the PCI hosting device is registered as an endpoint of the first server device and the second server device.

6. The PCI hosting device of claim 1, wherein the packet forwarding is between the one or more network interfaces and a first PCIe switch within the first server device, or between the one or more network interfaces and a second PCIe switch within the second server device.

7. The PCI hosting device of claim 1, wherein the PCI hosting device is activated as an endpoint of the first server device upon a corresponding driver software being executed in the first server device.

8. The PCI hosting device of claim 1, wherein a first dedicated memory region in the PCI hosting device is allocated to the first server device when the first server device is coupled to the PCI hosting device, and a second dedicated memory region in the PCI hosting device is allocated to the second server device when the second server device is coupled to the PCI hosting device.

9. The PCI hosting device of claim 8, wherein the first dedicated memory region in the PCI hosting device is released when the first server device is decoupled from the PCI hosting device, and then allocated to another server device.

10. The PCI hosting device of claim 1, wherein forwarding the packets comprises encapsulating packets from the first server device with a first virtual extensible local area network (VxLAN) packet header allocated to the first server device and encapsulating packets from the second server device with a second VxLAN packet header allocated to the second server device.

11. The PCI hosting device of claim 1, wherein forwarding the packets comprises encrypting packets from the first server device with a first encryption key allocated to the first server device and encrypting packets from the second server device with a second encryption key allocated to the second server device.

12. The PCI hosting device of claim 1, wherein each of the one or more network interfaces comprises a port designed to be connected to a small form-factor pluggable (SFP) transceiver, a quad SFP transceiver (QSFP), or an octal SFP (OSFP) transceiver.

13. The PCI hosting device of claim 1, wherein the PCI hosting device comprises a motherboard, and each of the plurality of PCI interfaces comprises a PCI slot on the motherboard.

14. The PCI hosting device of claim 13, wherein each PCI slot is isolated from another PCI slot on the motherboard.

15. A method comprising:
coupling a plurality of component interconnect (PCI) interfaces of a PCI hosting device to a plurality of server devices, each PCI interface being designed to be coupled to one server device from the plurality of server devices;
registering the PCI hosting device as a first PCI board for a first server device through a first PCI interface and as a second PCI board for a second server device through a second PCI interface once the first and second server devices are coupled to the PCI hosting device;
supplying power to the plurality of PCI interfaces, by a power supply of the PCI hosting device independently from one or more power supplies to supply power to the plurality of server devices; and
forwarding packets in PCI express (PCIe) protocol between one or more network interfaces and a first domain that includes the first server device and the first PCI interface, and between the one or more network interfaces and a second domain that includes the second server device and the second PCI interface, wherein packets in each of the first and second domains are unavailable to server devices outside that domain.

16. The method of claim 15, wherein each of the first and second PCI boards is a PCI express (PCIe) board, and the PCI hosting device is registered as an endpoint of the first server device and the second server device.

17. The method of claim 15, wherein the packet forwarding is between the one or more network interfaces and a first PCIe switch within the first server device, or between the one or more network interfaces and a second PCIe switch within the second server device.

18. The method of claim 15, wherein the PCI hosting device is activated as an endpoint of the first server device upon a corresponding driver software being executed in the first server device.

19. The method of claim 15, wherein a first dedicated memory region in the PCI hosting device is allocated to the first server device when the first server device is coupled to the PCI hosting device, and a second dedicated memory region in the PCI hosting device is allocated to the second server device when the second server device is coupled to the PCI hosting device.

20. A non-transitory machine-readable storage medium storing instructions, when executed by a processing circuit, causing the processing circuit to perform:
coupling a plurality of component interconnect (PCI) interfaces of a PCI hosting device to a plurality of server devices, each PCI interface being designed to be coupled to one server device from a plurality of server devices;
registering the PCI hosting device as a first PCI board for a first server device through a first PCI interface and as a second PCI board for a second server device through a second PCI interface once the first and second server devices are coupled to the PCI hosting device;
supplying power to the plurality of PCI interfaces, by a power supply of the PCI hosting device independently from one or more power supplies to supply power to the plurality of server devices; and
forwarding packets in PCI express (PCIe) protocol between one or more network interfaces and a first domain that includes the first server device and the first PCI interface, and between the one or more network interface and a second domain that includes the second server device and the second PCI interface, wherein packets in each of the first and second domains are unavailable to server devices outside that domain.

* * * * *